(12) United States Patent
Greenberger et al.

(10) Patent No.: US 11,699,171 B2
(45) Date of Patent: *Jul. 11, 2023

(54) BOUNDARY-SPECIFIC ELECTRONIC OFFERS

(71) Applicant: DoorDash, Inc., San Francisco, CA (US)

(72) Inventors: Jeremy A. Greenberger, Raleigh, NC (US); Zachary M. Greenberger, Raleigh, NC (US); Jana H. Jenkins, Raleigh, NC (US)

(73) Assignee: DoorDash, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,091

(22) Filed: Jul. 22, 2022

(65) Prior Publication Data

US 2022/0358543 A1  Nov. 10, 2022

Related U.S. Application Data

(63) Continuation of application No. 16/452,642, filed on Jun. 26, 2019, now Pat. No. 11,436,638, which is a
(Continued)

(51) Int. Cl.
*G06Q 30/00* (2023.01)
*G06Q 30/0251* (2023.01)
*H04W 4/02* (2018.01)

(52) U.S. Cl.
CPC ..... *G06Q 30/0261* (2013.01); *G06Q 30/0267* (2013.01); *H04W 4/02* (2013.01)

(58) Field of Classification Search
None
See application file for complete search history.

(56) References Cited

U.S. PATENT DOCUMENTS 6,154,745 A * 11/2000 Kari ............. H04W 4/029
707/769
6,202,023 B1 * 3/2001 Hancock ............. H04L 67/30
707/E17.11

(Continued)

FOREIGN PATENT DOCUMENTS

| EP | 751376 A2 * | 1/1997 | ............. G01C 21/34 |
| EP | 0751376 A2 | 1/1997 | |
| WO | 2013059716 A2 | 4/2013 | |

OTHER PUBLICATIONS

Mell et al., "The NIST Definition of Cloud Computing", National Institute of Standards and Technology, Sep. 2011, 7 pages.
(Continued)

*Primary Examiner* — Luis A Brown
(74) *Attorney, Agent, or Firm* — Kilpatrick Townsend & Stockton LLP

(57) ABSTRACT

In an approach to determining a boundary-specific offer, one or more computer processors determine a user of a mobile device is within a pre-defined physical boundary. The one or more computer processors determine a first notification of an offer corresponding to the pre-defined physical boundary. The one or more computer processors send the first notification of the offer to the mobile device. The one or more computer processors determine whether the user of the mobile device moved outside of the pre-defined physical boundary. In response to determining the user of the mobile device moved outside of the pre-defined physical boundary, the one or more computer processors invalidate the offer.

20 Claims, 6 Drawing Sheets

Related U.S. Application Data continuation of application No. 15/498,007, filed on Apr. 26, 2017, now Pat. No. 10,445,779.

(56) References Cited

U.S. PATENT DOCUMENTS

| | | | | |
|---|---|---|---|---|
| 6,219,614 B1* | 4/2001 | Uchigaki | | G01C 21/3632 |
| | | | | 701/428 |
| 6,252,544 B1* | 6/2001 | Hoffberg | | H04B 7/18576 |
| | | | | 701/445 |
| 6,253,069 B1* | 6/2001 | Mankovitz | | H04M 3/487 |
| | | | | 379/93.12 |
| 6,332,127 B1* | 12/2001 | Bandera | | G06Q 30/0257 |
| | | | | 705/14.55 |
| 6,353,398 B1* | 3/2002 | Amin | | G08G 1/096775 |
| | | | | 340/988 |
| 6,360,167 B1* | 3/2002 | Millington | | G01C 21/26 |
| | | | | 342/357.34 |
| 6,381,603 B1* | 4/2002 | Chan | | G06F 16/9537 |
| | | | | 707/999.005 |
| 6,421,675 B1* | 7/2002 | Ryan | | G06F 16/30 |
| 6,429,813 B2* | 8/2002 | Feigen | | G09B 29/102 |
| | | | | 701/414 |
| 6,571,279 B1* | 5/2003 | Herz | | G06F 16/9535 |
| | | | | 709/219 |
| 6,647,257 B2* | 11/2003 | Owensby | | H04L 67/535 |
| | | | | 455/414.1 |
| 6,647,414 B1* | 11/2003 | Eriksson | | G06Q 30/0277 |
| | | | | 709/227 |
| 6,741,188 B1* | 5/2004 | Miller | | G08G 1/0962 |
| | | | | 340/539.13 |
| 7,136,875 B2* | 11/2006 | Anderson | | G06F 16/951 |
| 7,246,109 B1* | 7/2007 | Ramaswamy | | G06F 16/9537 |
| 7,561,169 B2* | 7/2009 | Carroll | | G06T 17/05 |
| | | | | 701/4 |
| 8,015,060 B2 | 9/2011 | Redford et al. | | |
| 8,467,807 B1 | 6/2013 | Dalit et al. | | |
| 9,384,499 B2 | 7/2016 | Lyons et al. | | |
| 9,468,056 B2* | 10/2016 | Barnett | | H05B 45/24 |
| 9,648,056 B1* | 5/2017 | Kim | | G06Q 30/0261 |
| 10,445,779 B2* | 10/2019 | Greenberger | | G06Q 30/0267 |
| 10,708,713 B2* | 7/2020 | Dewan | | G06F 16/29 |
| 2002/0046084 A1* | 4/2002 | Steele | | H04L 67/306 |
| | | | | 705/14.64 |
| 2002/0065068 A1* | 5/2002 | Nobukiyo | | H04M 3/493 |
| | | | | 455/414.2 |
| 2002/0065713 A1 | 5/2002 | Awada et al. | | |
| 2002/0091571 A1 | 7/2002 | Thomas et al. | | |
| 2002/0095333 A1* | 7/2002 | Jokinen | | G06Q 30/0269 |
| | | | | 705/14.66 |
| 2002/0103892 A1* | 8/2002 | Rieger, III | | H04L 51/222 |
| | | | | 709/223 |
| 2002/0128903 A1* | 9/2002 | Kernahan | | G06Q 30/02 |
| | | | | 705/14.69 |
| 2002/0164977 A1* | 11/2002 | Link, II | | G06Q 30/02 |
| | | | | 455/414.1 |
| 2004/0006425 A1* | 1/2004 | Wood | | G09B 29/10 |
| | | | | 701/532 |
| 2004/0210386 A1* | 10/2004 | Wood | | G09B 29/10 |
| | | | | 701/532 |
| 2004/0254723 A1* | 12/2004 | Tu | | G01C 21/3679 |
| | | | | 701/410 |
| 2005/0043857 A1* | 2/2005 | Van Fleet | | G06Q 10/087 |
| | | | | 700/286 |
| 2005/0093690 A1* | 5/2005 | Miglionico | | G08B 13/2462 |
| | | | | 340/572.1 |
| 2005/0209921 A1* | 9/2005 | Roberts | | G06Q 30/0211 |
| | | | | 705/14.35 |
| 2005/0261822 A1* | 11/2005 | Wako | | G01C 21/3682 |
| | | | | 701/438 |
| 2006/0149605 A1* | 7/2006 | Mo | | G06Q 20/40 |
| | | | | 235/472.02 |
| 2006/0238379 A1* | 10/2006 | Kimchi | | G08G 1/0969 |
| | | | | 340/995.1 |
| 2007/0008120 A1* | 1/2007 | Smith | | G06Q 10/08 |
| | | | | 340/539.26 |
| 2007/0050249 A1* | 3/2007 | Huang | | G06Q 30/00 |
| | | | | 705/14.62 |
| 2007/0067203 A1* | 3/2007 | Gil | | G06Q 30/0203 |
| | | | | 705/7.29 |
| 2008/0021637 A1* | 1/2008 | Staton | | G07C 9/28 |
| | | | | 701/408 |
| 2008/0052169 A1 | 2/2008 | O"Shea et al. | | |
| 2008/0153487 A1* | 6/2008 | Martin | | H04W 4/02 |
| | | | | 455/435.1 |
| 2008/0221984 A1 | 9/2008 | Abhyanker | | |
| 2008/0248815 A1* | 10/2008 | Busch | | H04L 67/52 |
| | | | | 455/456.5 |
| 2008/0281687 A1* | 11/2008 | Hurwitz | | G06Q 30/0255 |
| | | | | 705/14.1 |
| 2009/0286553 A1* | 11/2009 | Northway | | H04L 67/52 |
| | | | | 455/456.3 |
| 2010/0240399 A1* | 9/2010 | Roumeliotis | | G06Q 30/0267 |
| | | | | 455/456.3 |
| 2011/0060652 A1* | 3/2011 | Morton | | H04W 4/021 |
| | | | | 705/14.58 |
| 2011/0093339 A1* | 4/2011 | Morton | | G06Q 30/02 |
| | | | | 705/14.58 |
| 2012/0088523 A1* | 4/2012 | Shirakawa | | H04L 67/52 |
| | | | | 455/456.3 |
| 2012/0271715 A1* | 10/2012 | Morton | | G06Q 30/0257 |
| | | | | 705/14.53 |
| 2012/0284132 A1* | 11/2012 | Kim | | G06Q 20/18 |
| | | | | 235/375 |
| 2013/0073392 A1* | 3/2013 | Allen | | G06Q 30/0633 |
| | | | | 705/26.8 |
| 2013/0080279 A1* | 3/2013 | Daily | | G07G 1/009 |
| | | | | 705/23 |
| 2013/0173373 A1 | 7/2013 | Hsu et al. | | |
| 2013/0191213 A1* | 7/2013 | Beck | | G06Q 30/0207 |
| | | | | 705/14.64 |
| 2013/0268886 A1* | 10/2013 | Sureshkumar | | G06F 3/04842 |
| | | | | 715/810 |
| 2013/0275198 A1* | 10/2013 | Zeto, III | | G06Q 30/0225 |
| | | | | 705/14.26 |
| 2013/0284806 A1* | 10/2013 | Margalit | | G07G 1/0009 |
| | | | | 235/382 |
| 2013/0297420 A1 | 11/2013 | Roberts et al. | | |
| 2013/0331128 A1* | 12/2013 | Qiu | | G01S 5/0294 |
| | | | | 455/456.3 |
| 2014/0129337 A1* | 5/2014 | Otremba | | G06Q 30/0261 |
| | | | | 705/14.58 |
| 2014/0149202 A1* | 5/2014 | Owen | | G06Q 30/0235 |
| | | | | 705/14.35 |
| 2014/0167961 A1* | 6/2014 | Finlow-Bates | | H04W 4/021 |
| | | | | 340/541 |
| 2014/0180817 A1* | 6/2014 | Zilkha | | G06F 16/24575 |
| | | | | 705/14.55 |
| 2014/0222603 A1* | 8/2014 | Hay | | G06Q 20/18 |
| | | | | 705/16 |
| 2014/0279009 A1 | 9/2014 | Grigg et al. | | |
| 2015/0029339 A1* | 1/2015 | Kobres | | H04N 7/181 |
| | | | | 348/150 |
| 2015/0088641 A1* | 3/2015 | Aoki | | G06Q 30/0251 |
| | | | | 705/14.49 |
| 2015/0149274 A1* | 5/2015 | Conrad | | G06Q 30/0261 |
| | | | | 705/14.54 |
| 2015/0213496 A1 | 7/2015 | Mcdevitt et al. | | |
| 2015/0242888 A1* | 8/2015 | Zises | | G06Q 30/0252 |
| | | | | 705/14.5 |
| 2015/0269600 A1* | 9/2015 | Randle | | G06Q 30/0211 |
| | | | | 705/14.14 |
| 2015/0278864 A1* | 10/2015 | McDevitt | | G06Q 30/0261 |
| | | | | 705/14.58 |
| 2015/0302456 A1* | 10/2015 | Rego | | G06Q 30/0235 |
| | | | | 705/14.35 |
| 2015/0348122 A1* | 12/2015 | Cornell | | G06Q 30/0261 |
| | | | | 705/14.58 |
| 2016/0027056 A1* | 1/2016 | Taslimi | | G06Q 30/0277 |
| | | | | 705/14.45 |

(56) References Cited

U.S. PATENT DOCUMENTS

| | | | |
|---|---|---|---|
| 2016/0098755 A1* | 4/2016 | Silvestro | G06Q 30/0258 705/14.58 |
| 2016/0187210 A1* | 6/2016 | Coleman | G01G 19/083 73/862.639 |
| 2016/0210598 A1 | 7/2016 | Novick et al. | |
| 2016/0292975 A1* | 10/2016 | Boullery | H05B 45/40 |
| 2016/0379225 A1* | 12/2016 | Rider | G06Q 30/0201 382/116 |
| 2017/0032416 A1* | 2/2017 | Soni | G06Q 30/0254 |
| 2017/0034659 A1* | 2/2017 | Shnitzer | G06F 3/04842 |
| 2017/0039613 A1* | 2/2017 | Kaehler | G02B 27/0172 |
| 2017/0053330 A1* | 2/2017 | Smith | G06Q 30/0613 |
| 2017/0169440 A1* | 6/2017 | Dey | H04W 4/021 |
| 2018/0060911 A1* | 3/2018 | DeLuca | G06Q 30/0269 |
| 2018/0165711 A1* | 6/2018 | Montemayor | G06Q 30/0255 |
| 2018/0232753 A1* | 8/2018 | Billau | G06Q 30/0205 |
| 2018/0276651 A1* | 9/2018 | Gauli | H04W 4/80 |
| 2018/0285422 A1* | 10/2018 | Sambasivam | G06Q 30/0258 |
| 2018/0315087 A1* | 11/2018 | Greenberger | G06Q 30/0267 |
| 2018/0315090 A1 | 11/2018 | Greenberger et al. | |

OTHER PUBLICATIONS

U.S. Appl. No. 15/498,007, Non-Final Office Action, dated Nov. 8, 2018, 14 pages.

U.S. Appl. No. 15/498,007, Final Office Action, dated Apr. 30, 2019, 11 pages.

U.S. Appl. No. 15/498,007, Notice of Allowance, dated Jun. 3, 2019, 19 pages.

U.S. Appl. No. 16/452,642, Non-Final Office Action, dated Sep. 1, 2020, 14 pages.

U.S. Appl. No. 16/452,642, Non-Final Office Action, dated Dec. 14, 2020, 14 pages.

U.S. Appl. No. 16/452,642, Final Office Action, dated Mar. 19, 2021, 16 pages.

U.S. Appl. No. 16/452,642, Non-Final Office Action, dated Aug. 13, 2021, 13 pages.

U.S. Appl. No. 16/452,642 , Notice of Allowance, dated Apr. 27, 2022, 19 pages.

U.S. Appl. No. 15/856,317, Non-Final Office Action, dated Apr. 20, 2018, 13 pages.

U.S. Appl. No. 15/856,317, Final Office Action, dated Aug. 10, 2018, 16 pages.

* cited by examiner

BOUNDARY-SPECIFIC ELECTRONIC OFFERS

This application is a continuation of U.S. patent application Ser. No. 16/452,642 filed on Jun. 26, 2019, which is a continuation of U.S. patent application Ser. No. 15/498,007 filed Apr. 26, 2017 (now U.S. Pat. No. 10,445,779), the contents of which are incorporated by reference in their entirety for all purposes.

BACKGROUND OF THE INVENTION

The present invention relates generally to the field of electronic coupon transmission, and more particularly to boundary-specific electronic offers.

Product manufacturers and retailers have long offered coupons as incentives for purchasing particular products. Typically, coupons offer consumers a discount or other reward for purchasing a particular product and have been distributed by manufacturers and retailers in a paper format. A consumer may redeem a paper coupon by taking the paper coupon to a retailer and purchasing products that satisfy the terms of the paper coupon. Additionally, techniques have been developed to enable exchange and/or redemption of coupons electronically.

Proximity marketing is the offering of specially selected information, products, or services to customers, based on their current location—often in a retail environment, arena, public building, or space. Offers are most often made on a mobile device, when the user has "opted in" for offers. The customer's location may be determined by a plurality of techniques, including utilization of indoor or outdoor sensors and location tracking of the customer's mobile device. That location is shared with an integrated database, which sends an offer—a form of "push notification"—based on that customer's profile. This targeting precision has tremendous potential for marketers and venue operators.

SUMMARY

Embodiments of the present invention disclose a method, a computer program product, and a system for determining a boundary-specific offer. The method may include one or more computer processors determining a user of a mobile device is within a pre-defined physical boundary. The one or more computer processors determine a first notification of an offer corresponding to the pre-defined physical boundary. The one or more computer processors send the first notification of the offer to the mobile device. The one or more computer processors determine whether the user of the mobile device moved outside of the pre-defined physical boundary. In response to determining the user of the mobile device moved outside of the pre-defined physical boundary, the one or more computer processors invalidate the offer.

DETAILED DESCRIPTION

Data analytics and machine learning have enabled marketers and retailers to provide a personalized approach to selling products to consumers. If consumers know that by entering a store, the retailer may offer additional savings above and beyond current advertised sales, the consumers may be more likely to patronize the store over other options. Additionally, many retailers prefer to capture sales as soon as possible and may want to promote on-demand purchasing to increase total sales. Embodiments of the present invention recognize that efficiency of retails sales may be gained and revenue may be increased by promoting on-demand purchasing by consumers in a retail environment. Embodiments of the present invention enable retailers and venue operators to create coupons or promotions which are specific to a boundary location and expire when the consumer exits the boundary. Implementation of embodiments of the invention may take a variety of forms, and exemplary implementation details are discussed subsequently with reference to the Figures.

Figure 1:
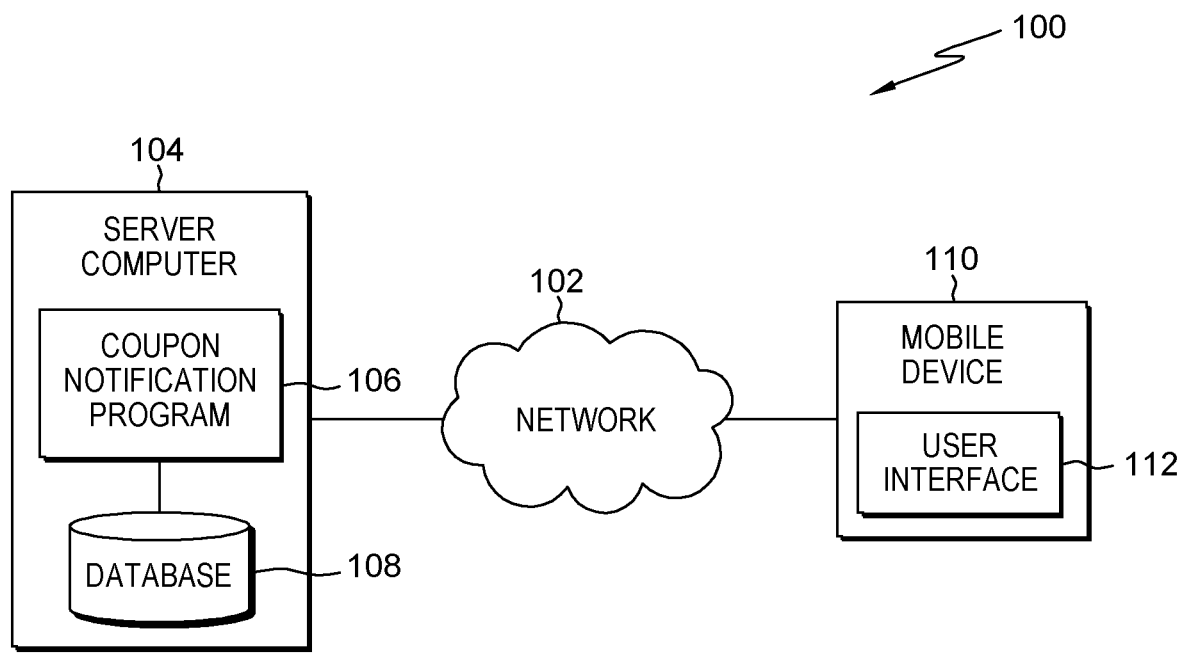
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and mobile device 110, interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 104, mobile device 110, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with mobile device 110 and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes coupon notification program 106 and database 108. Server computer 104 may include internal and external hardware components, as depicted and described in further detail with respect to FIG. 4.

Coupon notification program 106 enables retailers and venue operators to create coupons or promotions which are specific to a boundary location and expire when the consumer exits the boundary. The boundary specified by the retailer or venue operator may be a location such as a store or an area within a store. Coupon notification program 106 establishes the boundary using geolocation information. As used herein, geolocation information may also be referred to as location information, positioning information, position information, global positioning information, network location, or the like. Geolocation information associated with a user refers to geographical or network information associated with a location of a mobile device. Coupon notification program 106 detects the presence of a user's mobile device, such as mobile device 110, within a specified location or boundary. Coupon notification program 106 determines a notification of a coupon or promotion, which may be based on a stored user profile. Coupon notification program 106 sends the notification to mobile device 110. If coupon notification program 106 detects mobile device 110 moves to within a threshold distance of the boundary prior to the user redeeming the coupon, then coupon notification program 106 may send an additional notification. In response to detecting mobile device 110 is outside of the boundary, coupon notification program 106 invalidates the coupon such that the user can no longer take advantage of the promotion. In the depicted embodiment, coupon notification program 106 is a standalone program. In another embodiment, coupon notification program 106 may be integrated into one or more of a plurality of existing cloud-based services for notifications and alerts, as would be recognized by one skilled in the art. Coupon notification program 106 is depicted and described in further detail with respect to FIG. 2.

Database 108 is a repository for data used by coupon notification program 106. In the depicted embodiment, database 108 resides on server computer 104. In another embodiment, database 108 may reside elsewhere within distributed data processing environment 100 provided coupon notification program 106 has access to database 108. A database is an organized collection of data. Database 108 can be implemented with any type of storage device capable of storing data and configuration files that can be accessed and utilized by server computer 104, such as a database server, a hard disk drive, or a flash memory. Database 108 stores metadata associated with a user of user interface 112, such as a history of use of user interface 112 with a client computing device, such as mobile device 110. Database 108 may also store a user profile with shopping preferences in a particular store or venue. Database 108 may also store a history of purchases made by the user of mobile device 110 in one or more stores or venues. In addition to the history of purchases made, database 108 may also store data associated with the use of coupons or promotions with previous purchases.

Mobile device 110 can be one or more of a laptop computer, a tablet computer, a smart phone, or any programmable electronic device capable of communicating with various components and devices within distributed data processing environment 100, via network 102. Mobile device 110 can be a wearable computer. Wearable computers are miniature electronic devices that may be worn by the bearer under, with or on top of clothing, as well as in glasses, hats, or other accessories. Wearable computers can be especially useful for applications that require more complex computational support than just hardware coded logics. In general, mobile device 110 represents any programmable electronic device or combination of programmable electronic devices capable of executing machine readable program instructions and communicating with other computing devices (not shown) within distributed data processing environment 100 via a network, such as network 102. Mobile device 110 includes user interface 112.

User interface 112 provides an interface for a user of mobile device 110 with coupon notification program 106. In one embodiment, user interface 112 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. In another embodiment, user interface 112 may also be mobile application software that provides an interface between a user of mobile device 110 and server computer 104. Mobile application software, or an "app," is a computer program designed to run on smart phones, tablet computers and other mobile devices. User interface 112 enables mobile device 110 to receive notifications from coupon notification program 106. In one embodiment, user interface 112 is a venue-specific app, downloaded to mobile device 110 by a user, which enables communication between mobile device 110 and coupon notification program 106. In the embodiment, a user can set up preferences, via the app, associated with coupon notifications, and whether to allow coupon notification program 106 to detect the device location.

Figure 2:
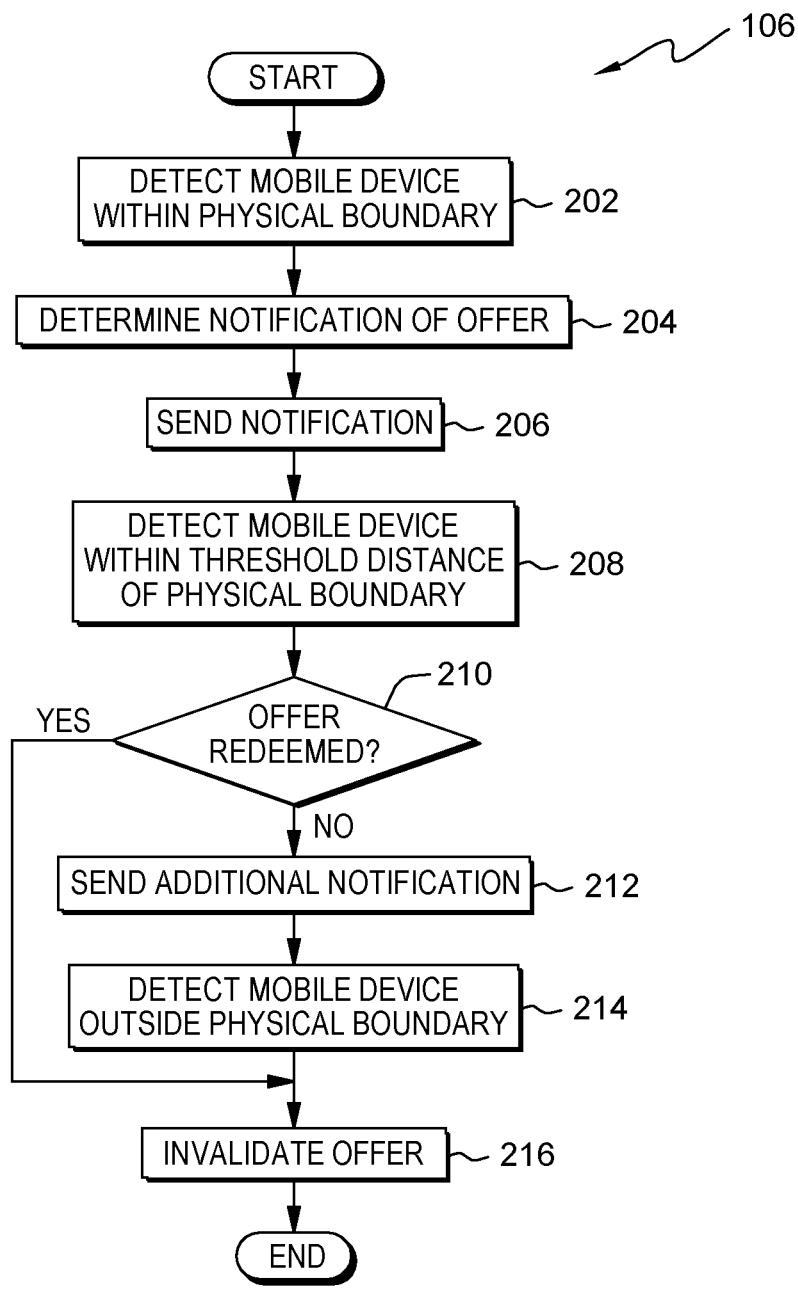
FIG. 2 is a flowchart depicting operational steps of a coupon notification program, on a server computer within the distributed data processing environment of FIG. 1, for notifying a user of a boundary-specific coupon, in accordance with an embodiment of the present invention.

FIG. 2 is a flowchart depicting operational steps of coupon notification program 106, on server computer 104 within distributed data processing environment 100 of FIG. 1, for notifying a user of a boundary-specific coupon, in accordance with an embodiment of the present invention.

Coupon notification program 106 detects a mobile device within a physical boundary (step 202). In one embodiment, a venue operator defines a physical boundary for where a coupon or promotion is valid within the venue. The physical boundary may be, for example, a retail store, a restaurant, or a sports stadium. In another example, the physical boundary may be a specified area within a venue, such as an aisle in a grocery store. Coupon notification program 106 uses one or more of a plurality of techniques known in the art to detect the presence of a mobile device, such as mobile device 110, as the device enters a pre-defined physical boundary, location, or zone. For example, coupon notification program 106 may use a global positioning system (GPS), Wi-Fi®, Bluetooth®, RFID, etc. In one embodiment, the boundary is location-based. For example, a boundary may be defined as a location within a radius of a specific distance of one or more transceiver devices that transmit a beacon signal in a venue. In another example, a boundary may be defined by GPS coordinates. In another embodiment, the boundary may also include a time requirement, where coupon notification program 106 detects the location of a mobile device within a pre-defined period of time. For example, the device enters a particular location of a venue during a specific time period, such as between 3:00 μm and 4:00 μm. In a further embodiment, coupon notification program 106 may require that the target device reside in the pre-defined location for a specified period of time. For example, the mobile device enters a particular location of a retail store and stays in the location for at least 30 seconds. In one embodiment, upon detection of the mobile device, coupon notification program 106 determines whether the mobile device includes user interface 112.

Coupon notification program 106 determines a notification of an offer (step 204). Coupon notification program 106 determines a notification that includes an offer for an appropriate coupon, promotion, discount, etc. for the user of mobile device 110. In one embodiment, coupon notification program 106 determines the notification based on the venue. For example, the same discount may be offered to any user entering the physical boundary. In another embodiment, coupon notification program 106 may determine the notification based on a user profile of the user of mobile device 110, stored in database 108. For example, coupon notification program 106 may determine the notification based on user preferences registered in a user profile, via user interface 112, such as particular styles or types of products the user buys in the venue. In another embodiment, coupon notification program 106 may determine the notification based on a history of purchases the user has made in the venue. For example, if the venue has a shopper loyalty program, and the user shops in the venue every week, coupon notification program 106 may determine a more significant discount than coupon notification program 106 may offer to an occasional shopper. In a further embodiment, coupon notification program 106 may determine the offer in response to receiving a promotion or coupon from a venue operator or another third party.

Coupon notification program 106 sends the notification (step 206). In response to determining a notification, coupon notification program 106 sends the notification to the user of mobile device 110, via user interface 112. In an embodiment where coupon notification program 106 is integrated into an existing cloud-based service for notifications and alerts, the cloud-based service sends the notification. The notification may include an expiratory location to indicate to the user the location of the physical boundary of the coupon. For example, if the physical boundary is a shoe store, the notification may be "Buy one, get one free shoes this visit only!" In another example, if the physical boundary is a location within a store, the notification may be "Put a box of cereal in your basket before you leave the cereal aisle and get 20% off!"

Coupon notification program 106 detects the mobile device within a threshold distance of the physical boundary (step 208). As discussed with respect to step 202, coupon notification program 106 detects the location of mobile device 110 moving within the pre-defined physical boundary of a venue using one or more of a plurality of techniques known in the art. Coupon notification program 106 determines when mobile device 110 is within a pre-defined threshold distance of the physical boundary, which may indicate that the user of mobile device 110 may be considering leaving the boundary. For example, coupon notification program 106 may detect when the user of mobile device 110 is within two feet of the door of the store.

Coupon notification program 106 determines whether the offer has been redeemed (decision block 210). Coupon notification program 106 determines whether the user of mobile device 110 has made a purchase using the previously sent coupon or promotion notification using one or more techniques known in the art. In one embodiment, coupon notification program 106 may be integrated into the point of sale system of the venue, and is aware when the coupon is redeemed during a purchase using, for example, a bar code or a quick response (QR) code via user interface 112. In another embodiment, coupon notification program 106 may receive a confirmation from the point of sale system of the venue to determine whether the user redeemed the coupon. In an embodiment where the physical boundary is a specified area within a venue, coupon notification program 106 may determine whether a user redeemed the coupon prior to the actual purchase of an item. For example, if the physical boundary is an aisle in a grocery store, then coupon notification program 106 may determine the coupon is redeemed when the user snaps the QR code on the item via user interface 112. In another example, if the venue employs smart shelf technology, as would be recognized by one of skill in the art, then coupon notification program 106 may determine the coupon is redeemed when the user removes an item from a shelf and the item is not returned to the shelf within a pre-defined duration of time. In yet another example, coupon notification program 106 may determine the coupon is redeemed when the user accepts the discount, via user interface 112, prior to leaving the physical boundary.

If coupon notification program 106 determines the offer has not been redeemed ("no" branch, decision block 210), then coupon notification program 106 sends an additional notification (step 212). Coupon notification program 106 may send an additional notification in order to incent the user to make a purchase before leaving the venue. In one embodiment, when coupon notification program 106 determines a user is leaving the physical boundary before redeeming the coupon, coupon notification program 106 sends the user an additional notification to alert the user that the coupon expires when the user leaves the physical boundary. For example, the additional notification may be "Don't forget—the special offer expires when you leave the store!" In another embodiment, coupon notification program 106 may modify the offer such that the offer remains valid after the user leaves the physical boundary, i.e., extending the expiration of the promotion. For example, the additional notification may be "Tap the screen to extend the coupon for an additional 24 hours." In a further embodiment, coupon notification program 106 may offer a reduced discount if the user leaves the venue prior to redeeming the original coupon. For example, the additional notification may be "The 20% off coupon will expire when you leave the store. Would you like to accept an offer of 10% off when you return next time?"

Coupon notification program 106 detects the mobile device is outside of the physical boundary (step 214). As discussed with respect to step 202, coupon notification program 106 detects when mobile device 110 leaves the physical boundary using one or more of a plurality of techniques known in the art.

Responsive to detecting the mobile device is outside of the physical boundary, or if coupon notification program 106 determines the coupon has been redeemed ("yes" branch, decision block 210), then coupon notification program 106 invalidates the coupon (step 216). Coupon notification program 106 renders the coupon or promotion as invalid so the user cannot redeem the coupon in the future.

Figure 3:
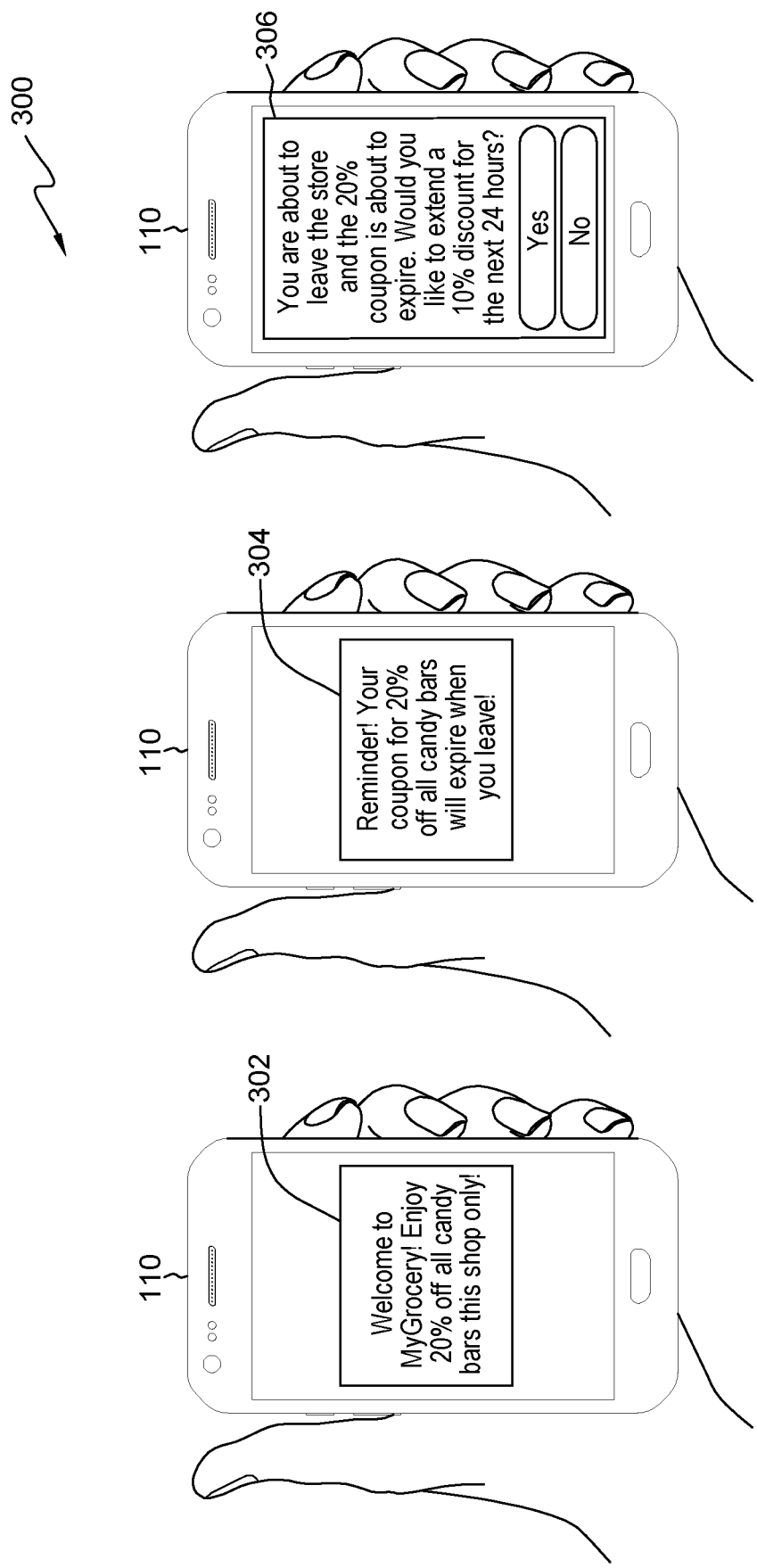
FIGS. 3A, 3B, and 3C illustrate an example of a user interface, on a mobile device within the distributed data processing environment of FIG. 1, in accordance with an embodiment of the present invention.

FIGS. 3A, 3B, and 3C illustrate example 300 of user interface 112, on mobile device 110 within distributed data processing environment 100 of FIG. 1, in accordance with an embodiment of the present invention.

FIG. 3A depicts notification 302, which coupon notification program 106 sent to mobile device 110, via user interface 112. As discussed with respect to step 206 of FIG. 2, coupon notification program 106 sends a notification to mobile device 110 upon detecting the presence of mobile device 110 within a pre-defined physical boundary. In the depicted example, coupon notification program 106 sends the notification "Welcome to MyGrocery! Enjoy 20% off all candy bars this shop only!" The notification includes both a discount ("20% off") and a physical boundary ("this shop only").

FIG. 3B depicts notification 304, which coupon notification program 106 sent to mobile device 110, via user interface 112. As discussed with respect to step 212 of FIG. 2, coupon notification program 106 may send a second notification to mobile device 110 upon detecting mobile device 110 within a threshold distance of the pre-defined physical boundary. In the depicted example, coupon notification program 106 sends the notification "Reminder! Your coupon for 20% off all candy bars will expire when you leave!" The notification is a reminder to the user that the coupon expires outside of the pre-defined physical boundary.

FIG. 3C depicts notification 306, which coupon notification program 106 sent to mobile device 110, via user interface 112. As discussed with respect to step 212 of FIG. 2, coupon notification program 106 may send an additional notification to mobile device 110 upon detecting mobile device 110 within a threshold distance of the pre-defined physical boundary. In the depicted example, coupon notification program 106 sends the notification "You are about to leave the store and the 20% coupon is about to expire. Would you like to extend a 10% discount for the next 24 hours?" In addition, the notification includes a display of a "yes" and a "no" button for the user to reply to the query. The notification enables the user to keep the coupon outside of the physical boundary, but only for 24 hours and at a reduced rate.

Figure 4:
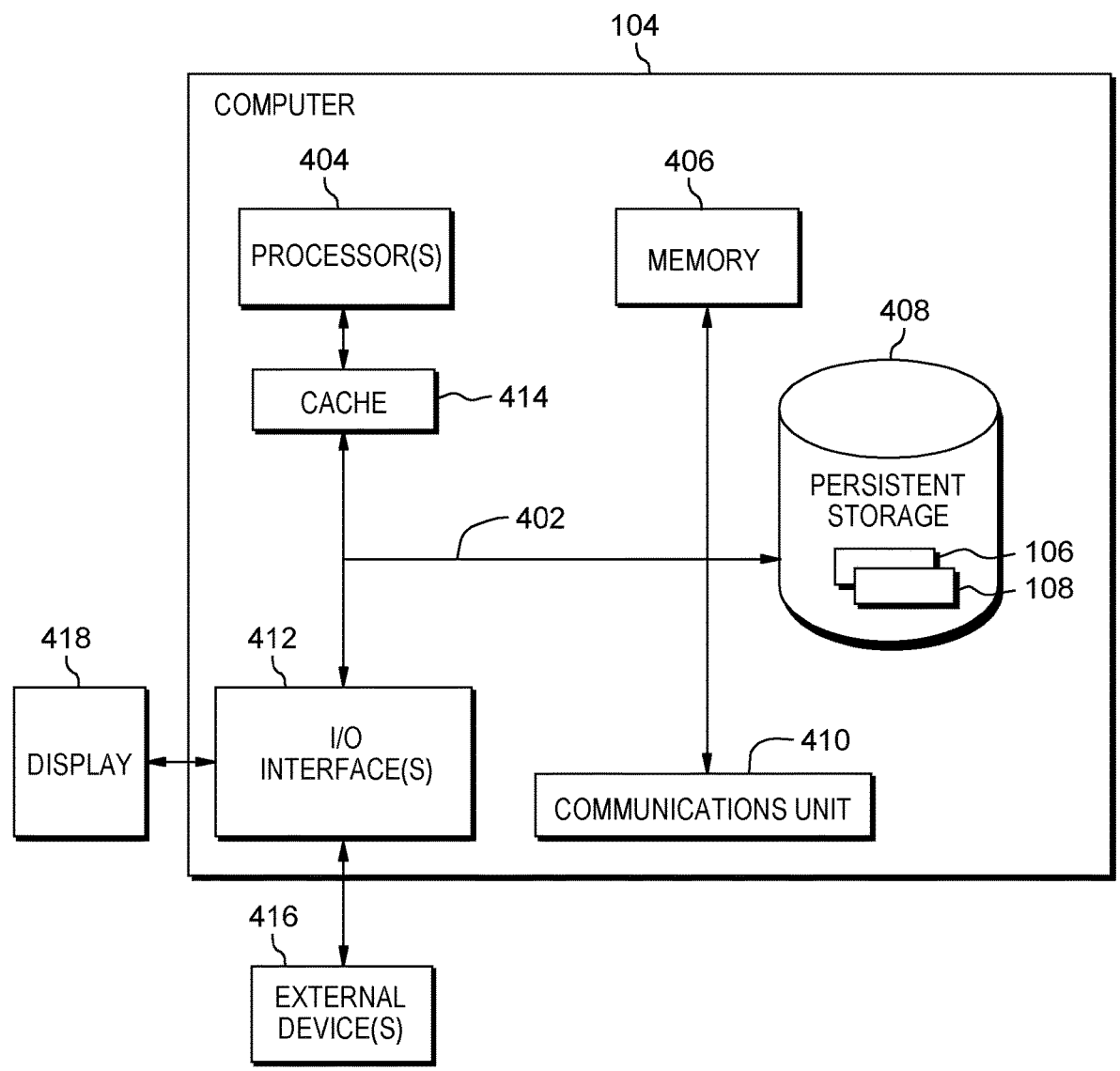
FIG. 4 depicts a block diagram of components of the server computer executing the coupon notification program within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 410, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., coupon notification program 106 and database 108, can be stored in persistent storage 408 for execution and/or access by one or more of the respective processor(s) 404 of server computer 104 via memory 406. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of mobile device 110. In these examples, communications unit 410 includes one or more network interface cards. Communications unit 410 may provide communications through the use of either or both physical and wireless communications links. Coupon notification program 106 and database 108 may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., coupon notification program 106 and database 108 on server computer 104, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor or the lenses of a head mounted display. Display 418 can also function as a touchscreen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
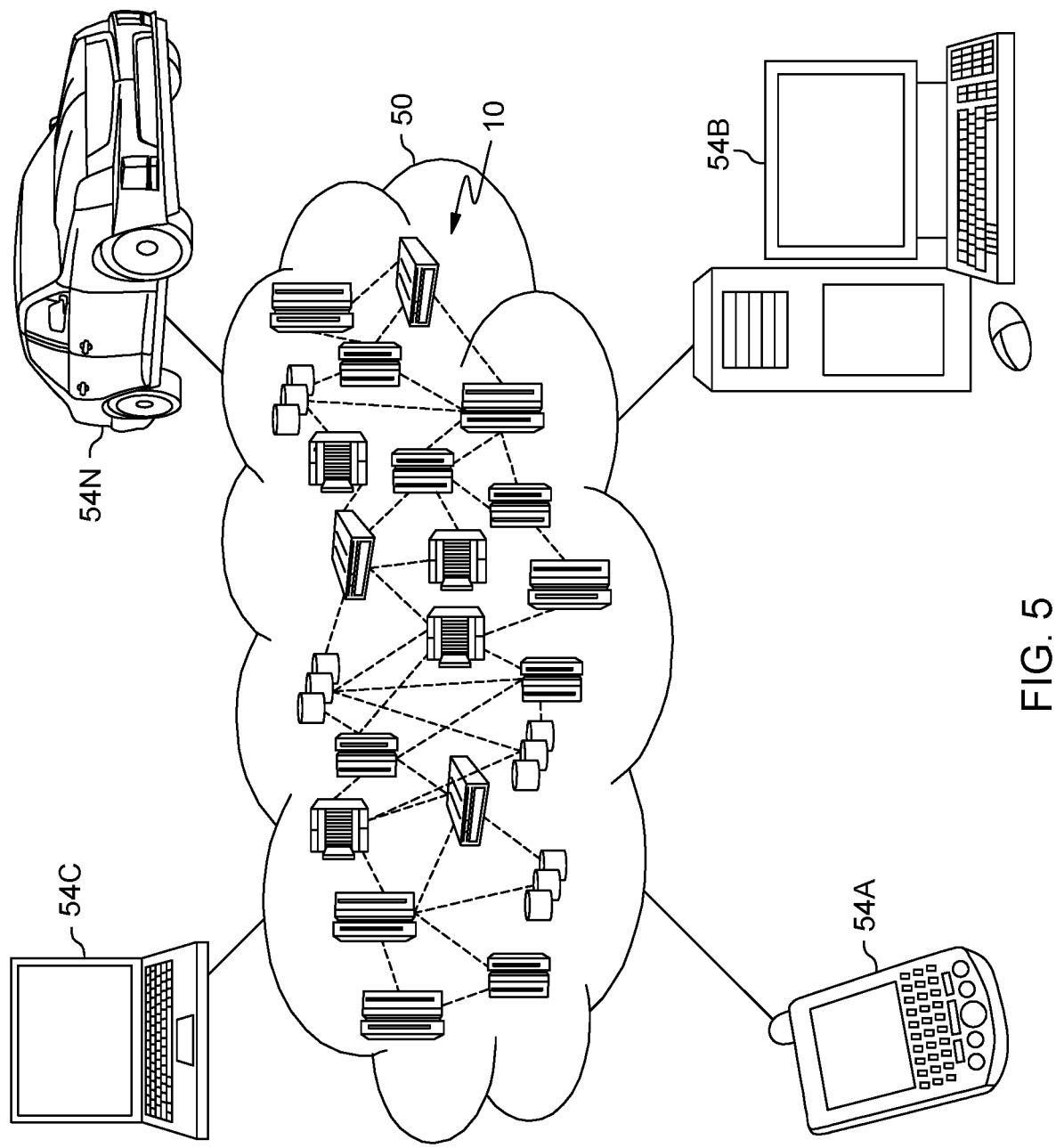
FIG. 5 depicts a cloud computing environment in accordance with an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 6:
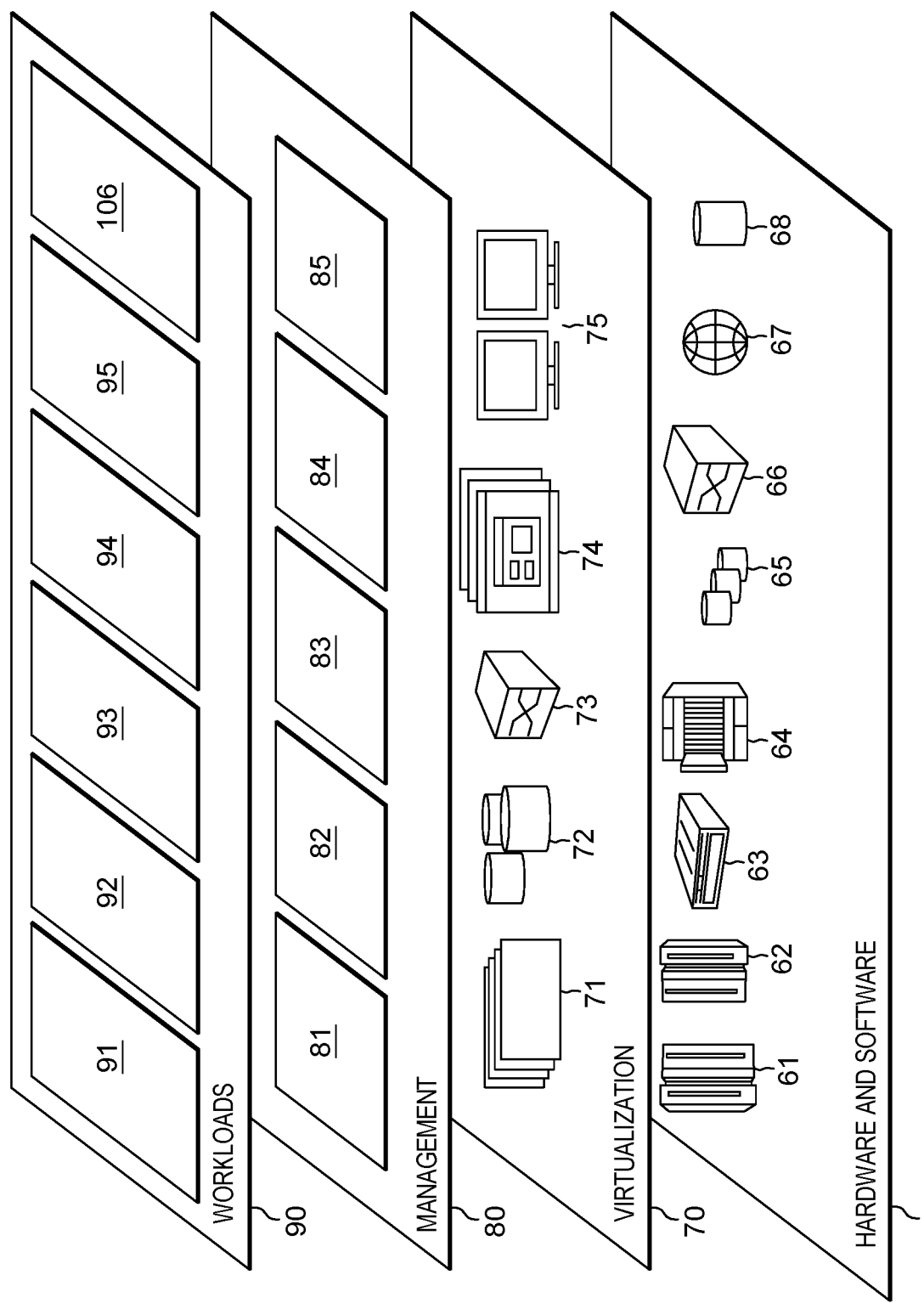
FIG. 6 depicts abstraction model layers in accordance with an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and coupon notification program 106.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for determining a boundary-specific electronic offer, the method comprising:
    determining, by one or more computer processors, a mobile device of a user is within a pre-defined physical boundary;
    determining, by the one or more computer processors, the mobile device resides in the pre-defined physical boundary for a pre-defined period of time;
    responsive to determining the mobile device resides in the pre-defined physical boundary for the pre-defined period of time, determining, by the one or more computer processors, a first notification of an offer corresponding to the pre-defined physical boundary;
    sending, by the one or more computer processors, the first notification of the offer to the mobile device or another mobile device;
    determining, by the one or more computer processors, whether the mobile device moved outside of the pre-defined physical boundary;
    responsive to determining the mobile device moved outside of the pre-defined physical boundary, invalidating, by the one or more computer processors, the offer;
    after sending the first notification of the offer to the mobile device or the another mobile device, determining, by the one or more computer processors, the mobile device is within a pre-defined threshold distance of exiting the pre-defined physical boundary;
    determining, by the one or more computer processors, the offer is not redeemed; and
    sending, by the one or more computer processors, a second notification to the mobile device or the another mobile device.

2. The method of claim 1, wherein the second notification indicates that the offer expires when the user exits the pre-defined physical boundary.

3. The method of claim 1, wherein the second notification presents a modification to the offer such that the offer remains valid after the user exits the pre-defined physical boundary.

4. The method of claim 1, wherein the second notification includes another offer for a reduced discount after the mobile device of the user exits the pre-defined physical boundary.

5. The method of claim 1, wherein the pre-defined physical boundary is defined by at least one of a location within a radius of a specific distance of one or more transceiver devices that transmit a beacon signal in a venue and GPS coordinates.

6. A computer program product for determining a boundary-specific electronic offer, the computer program product comprising:
    one or more computer readable storage devices and program instructions stored on the one or more computer readable storage devices, the program instructions comprising:
    program instructions to determine a mobile device of a user is within a pre-defined physical boundary;
    program instructions to determine the mobile device resides in the pre-defined physical boundary for a pre-defined period of time;
    responsive to determining the mobile device resides in the pre-defined physical boundary for the pre-defined period of time, program instructions to determine a first notification of an offer corresponding to the pre-defined physical boundary;
    program instructions to send the first notification of the offer to the mobile device or another mobile device;
    program instructions to determine whether the mobile device moved outside of the pre-defined physical boundary;
    responsive to determining the mobile device moved outside of the pre-defined physical boundary, program instructions to invalidate the offer;
    after sending the first notification of the offer to the mobile device or the another mobile device, program instructions to determine the mobile device of the user is within a pre-defined threshold distance of exiting the pre-defined physical boundary;
    program instructions to determine the offer is not redeemed; and
    program instructions to send a second notification to the mobile device or the another mobile device.

7. The computer program product of claim 6, wherein the second notification provides an indication that the offer expires when the user exits the pre-defined physical boundary.

8. The computer program product of claim 6, wherein the second notification presents a modification to the offer such that the offer remains valid after the user exits the pre-defined physical boundary.

9. The computer program product of claim 6, wherein the second notification includes another offer for a reduced discount.

10. The computer program product of claim 6, wherein the pre-defined physical boundary is defined by at least one of a location within a radius of a specific distance of one or more transceiver devices that transmit a beacon signal in a venue and GPS coordinates.

11. A computer system for determining a boundary-specific electronic offer, the computer system comprising:
one or more computer processors;
one or more computer readable storage devices;
program instructions stored on the one or more computer readable storage devices for execution by at least one of the one or more computer processors, the program instructions comprising:
program instructions to determine a mobile device of a user is within a pre-defined physical boundary;
program instructions to determine the mobile device resides in the pre-defined physical boundary for a pre-defined period of time;
responsive to determining the mobile device resides in the pre-defined physical boundary for the pre-defined period of time, program instructions to determine a first notification of an offer corresponding to the pre-defined physical boundary;
program instructions to send the first notification of the offer to the mobile device or another mobile device;
program instructions to determine whether the mobile device moved outside of the pre-defined physical boundary;
responsive to determining the mobile device moved outside of the pre-defined physical boundary, program instructions to invalidate the offer;
after sending the first notification of the offer to the mobile device or the another mobile device, program instructions to determine the mobile device of the user is within a pre-defined threshold distance of exiting the pre-defined physical boundary;
program instructions to determine the offer is not redeemed; and
program instructions to send a second notification to the mobile device or the another mobile device.

12. The computer system of claim 11, wherein the second notification provides an indication that the offer expires when the user exits the pre-defined physical boundary.

13. The computer system of claim 11, wherein the second notification presents a modification to the offer such that the offer remains valid after the user exits the pre-defined physical boundary.

14. The computer system of claim 11, wherein the second notification includes another offer after the mobile device exits the pre-defined physical boundary.

15. The computer system of claim 11, wherein the pre-defined physical boundary is defined by at least one of a location within a radius of a specific distance of one or more transceiver devices that transmit a beacon signal in a venue and GPS coordinates.

16. The method of claim 1, wherein the mobile device is a mobile phone and the another mobile device is a wearable device.

17. The method of claim 1, wherein the pre-defined physical boundary is based on GPS coordinates.

18. The method of claim 1, wherein the offer is determined based on a user profile.

19. The method of claim 1, wherein the pre-defined physical boundary is based upon geolocation information.

20. The method of claim 1, wherein the pre-defined physical boundary is based a store, venue, or restaurant.

* * * * *